(12) United States Patent
Stadelmann et al.

(10) Patent No.: US 8,747,034 B2
(45) Date of Patent: Jun. 10, 2014

(54) BORING HEAD

(75) Inventors: Rudolf Stadelmann, Niederuzwil (CH); Gottlieb Abderhalden, Egg (CH); Ralph Stadelmann, Schleinikon (CH)

(73) Assignee: Heinz Kaiser AG, Rumlang (CH)

( * ) Notice: Subject to any disclaimer, the term of this patent is extended or adjusted under 35 U.S.C. 154(b) by 468 days.

(21) Appl. No.: 13/048,152

(22) Filed: Mar. 15, 2011

(65) Prior Publication Data

US 2011/0222979 A1  Sep. 15, 2011

(30) Foreign Application Priority Data

Mar. 15, 2010  (CH) ..................................... 00357/10

(51) Int. Cl.
*B23B 29/04* (2006.01)

(52) U.S. Cl.
USPC ............ 408/189; 408/197; 408/224; 408/181

(58) Field of Classification Search
USPC .......... 408/189, 190, 191, 197, 224, 181, 185
See application file for complete search history.

(56) References Cited

U.S. PATENT DOCUMENTS

| | | | | |
|---|---|---|---|---|
| 2,402,650 A | * | 6/1946 | Maffia | ............................. 407/68 |
| 3,625,624 A | * | 12/1971 | Fitzsimmons | ................. 408/116 |
| 4,043,697 A | | 8/1977 | Eckle | |
| 4,101,239 A | * | 7/1978 | Wohlhaupter | ................. 408/182 |
| 4,231,691 A | | 11/1980 | Pape et al. | |
| 4,500,233 A | * | 2/1985 | Dehn | ............................. 408/182 |
| 4,632,609 A | | 12/1986 | Johne | |
| 5,330,297 A | * | 7/1994 | Engstrand | ..................... 408/153 |
| 6,183,174 B1 | | 2/2001 | Kaiser et al. | |
| 2005/0019118 A1 | * | 1/2005 | Elbaz et al. | .................... 408/186 |
| 2007/0036621 A1 | * | 2/2007 | Frank | ............................ 408/227 |
| 2009/0279963 A1 | * | 11/2009 | D'Andrea | ....................... 407/45 |

FOREIGN PATENT DOCUMENTS

| | | |
|---|---|---|
| CH | 611190 A5 | 5/1979 |
| CH | 627676 A5 | 1/1982 |
| CN | 1212192 A | 3/1999 |
| CN | 2573122 | 9/2003 |

(Continued)

OTHER PUBLICATIONS

Eurasian Search Report dated Jul. 27, 2011.

(Continued)

*Primary Examiner* — Daniel Howell
*Assistant Examiner* — Chwen-Wei Su
(74) *Attorney, Agent, or Firm* — Browdy and Neimark, PLLC

(57) ABSTRACT

The boring head has a tool body (2, 38), to which two cutter holders (3, 4; 22, 23) arranged offset from one another by 180° are fastened. The cutter holders (3, 4; 22, 23) are mounted on a clamping surface (11, 26) in a slidable manner for radially adjusting the cutters (5). The clamping surface (11, 26) has a first partial clamping surface (11*a*, 26*a*) for the one cutter holder (3, 4; 22, 23) and a second partial clamping surface (11*b*, 26*b*) for the other cutter holder (3, 4; 22, 23). These two partial clamping surfaces (11*a*, 11*b*; 26*a*, 26*b*) are offset in the axial direction by a certain extent. The two cutter holders (3, 4; 22, 23) have different heights with respect to the cutters (5) in accordance with this extent and in addition can be optionally fastened to and radially adjusted on the first partial clamping surface (11*a*, 26*a*) or the second partial clamping surface (11*b*, 26*b*). The boring head permits the conventional roughing work and is especially stable while being produced at a low cost.

10 Claims, 6 Drawing Sheets

(56) References Cited

FOREIGN PATENT DOCUMENTS

Figure 1:
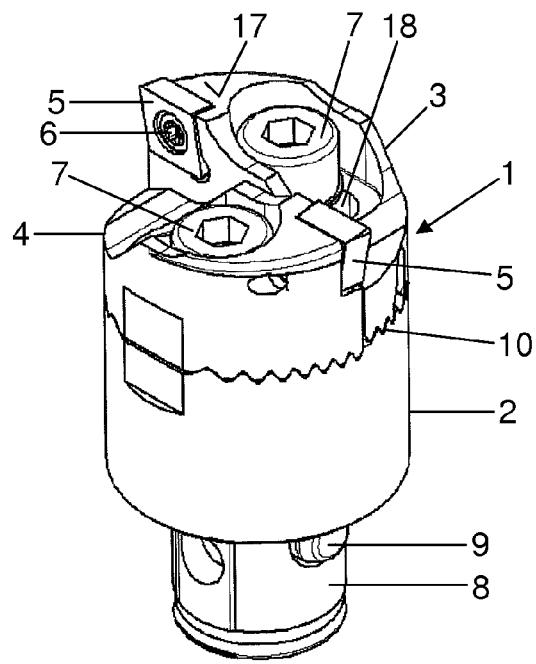

| | | |
|---|---|---|
| DE | 2611146 A1 | 11/1976 |
| EP | 0564425 A1 | 10/1993 |
| EP | 0835709 A1 | 4/1998 |
| EP | 0990477 A2 | 4/2000 |
| JP | 3-130302 U | 12/1991 |
| JP | 2009262307 A * | 11/2009 ............ B23B 29/034 |
| SU | 596382 A1 | 3/1978 |
| SU | 1046031 A | 10/1983 |
| SU | 1328077 A1 | 8/1987 |

OTHER PUBLICATIONS

Translation of Japanese office action dated Jan. 22, 2013.

* cited by examiner

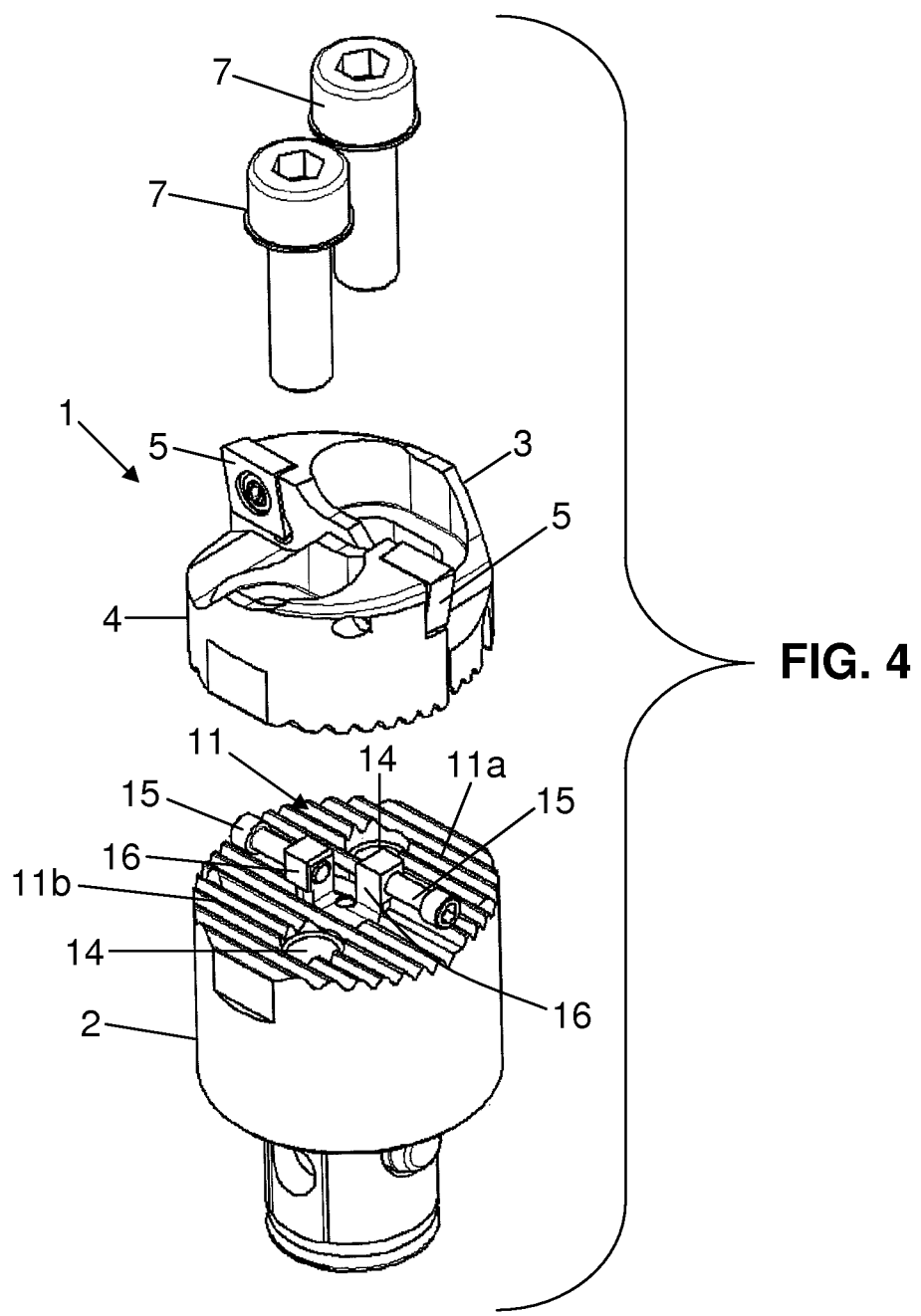

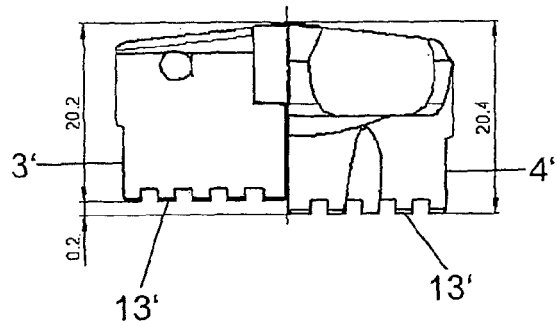
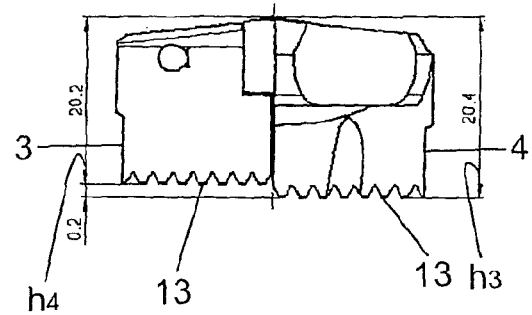
FIG. 5   FIG. 6
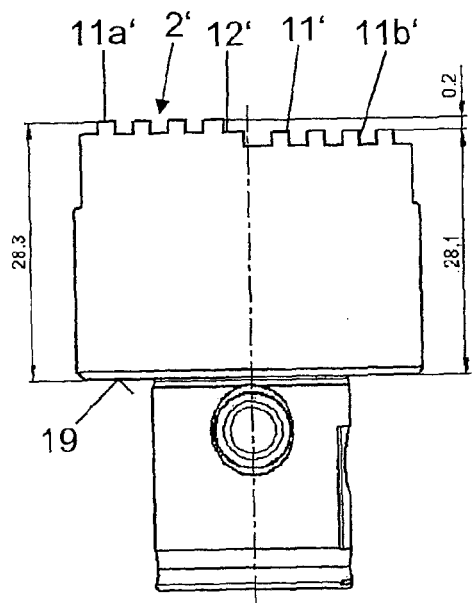
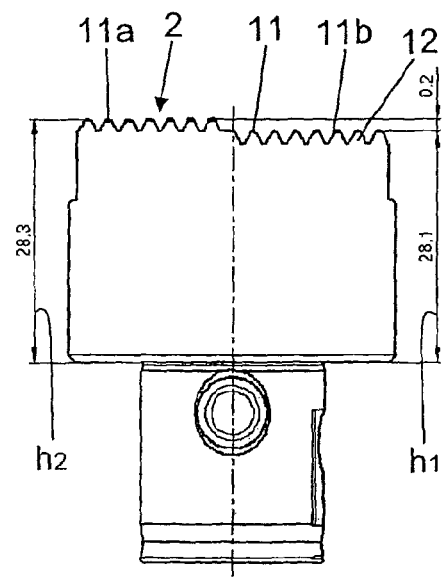
FIG. 7   FIG. 8

BORING HEAD

The invention relates to a boring head comprising a tool body and two cutter holders which are detachably fastened to said tool body, said cutter holders are arranged offset from one another by 180° and are mounted on a clamping surface in a slidable manner for radially adjusting the cutters, comprising clamping means for clamping the cutter holders against the clamping surface, and comprising adjusting means for radially adjusting the cutter holders.

Boring heads of this type have been known for a long time in the prior art. Reference is made here, for example, to EP-B-0 990 477, CH 627 676 and CH 611 190. Such twin-cutter boring heads are especially suitable for the rough machining of bores. Compared with single-cutter tools, the two cutters arranged offset from one another by 180° permit twice the feed rate. In principle, three types of roughing operations are possible. During double-offset roughing, the two cutters are offset axially and radially. During rotationally symmetrical roughing, the two cutters are offset neither axially nor radially. This is the most frequently used setting. During full profile roughing, the two cutters are offset in diameter to a considerable extent. For the roughing, especially high stability requirements are imposed on such boring heads. The cutter holders, which are individually adjustable axially and radially, are therefore to be supported in an especially stable manner on the tool body for the torque transmission. In order to offset the cutters axially, corresponding intermediate parts or adjusting screws were used hitherto. However, such intermediate parts or adjusting screws make the boring head less stable, which is especially disadvantageous for roughing work.

The object of the invention is to provide a boring head of the type mentioned at the beginning with which said roughing work can be carried out and which nonetheless is very stable and can be produced at a low cost.

This object is achieved in a boring head of the type in question in that the clamping surface has a first partial clamping surface for the one cutter holder and a second partial clamping surface for the other cutter holder, in that these two partial clamping surfaces are offset in the axial direction by a certain extent, in that the two cutter holders have different heights with respect to the cutters in accordance with this extent, and in that the two cutter holders can be optionally fastened to and radially adjusted on the first partial clamping surface or the second partial clamping surface. The boring head according to the invention can be used for said roughing work without the use of an additional part. In order to change over the boring head from the rotationally symmetrical roughing to the double-offset roughing, the two cutter holders merely have to be interchanged. It is also essential that toothing between the tool body and the cutter holders is possible in the boring head according to the invention. Such toothing is known in the prior art per se, for example from CH 611 190. However, roughing with axial offset of the cutters was hitherto not possible with such toothing. However, the invention can be realized in an especially simple manner in a boring head in which the two cutter holders are arranged on an elongated bridge-like tool body. A bridge-like boring head has been disclosed in the prior art by CN 2009-262307. However, this boring head does not permit double-offset roughing.

Further advantageous features follow from the dependent claims, from the description below and from the drawing.

Figures 2, 3:
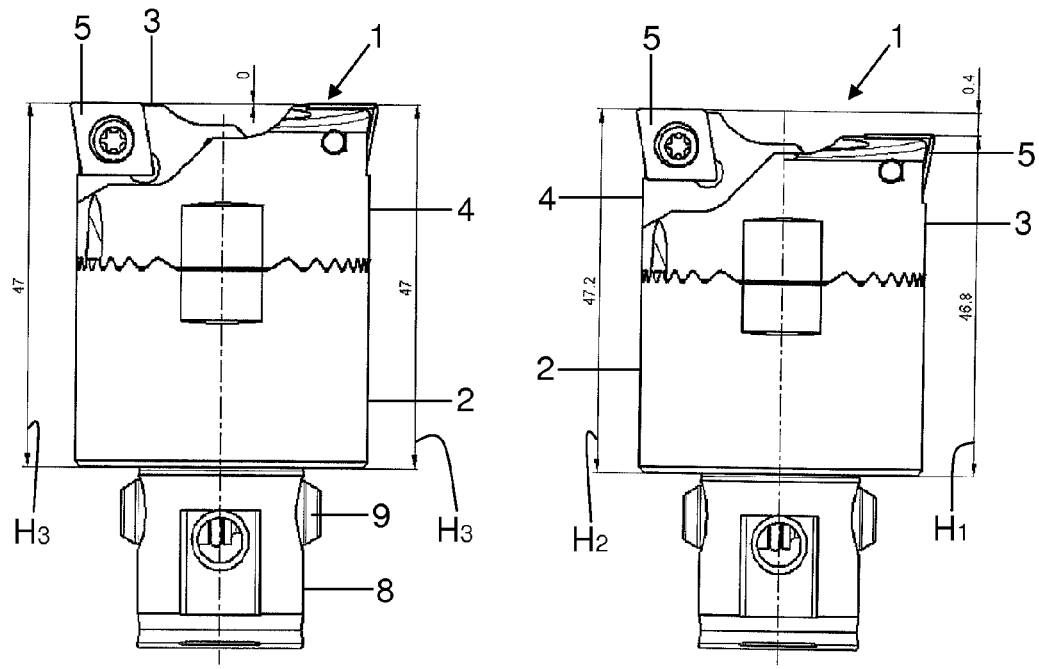
Figure 9:
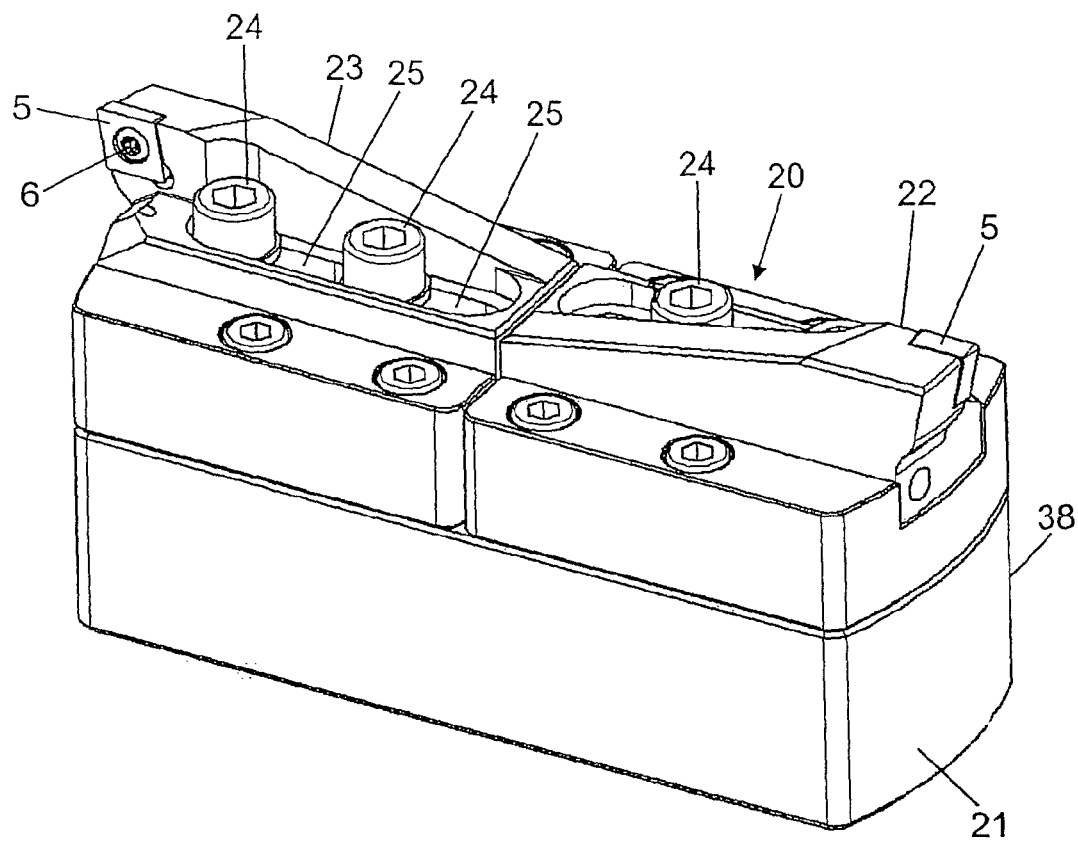
Figure 10:
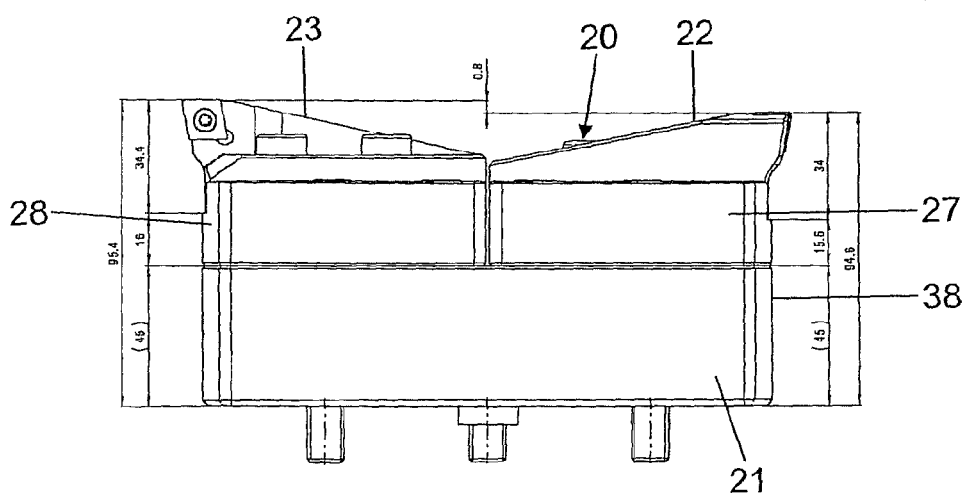
Figure 11:
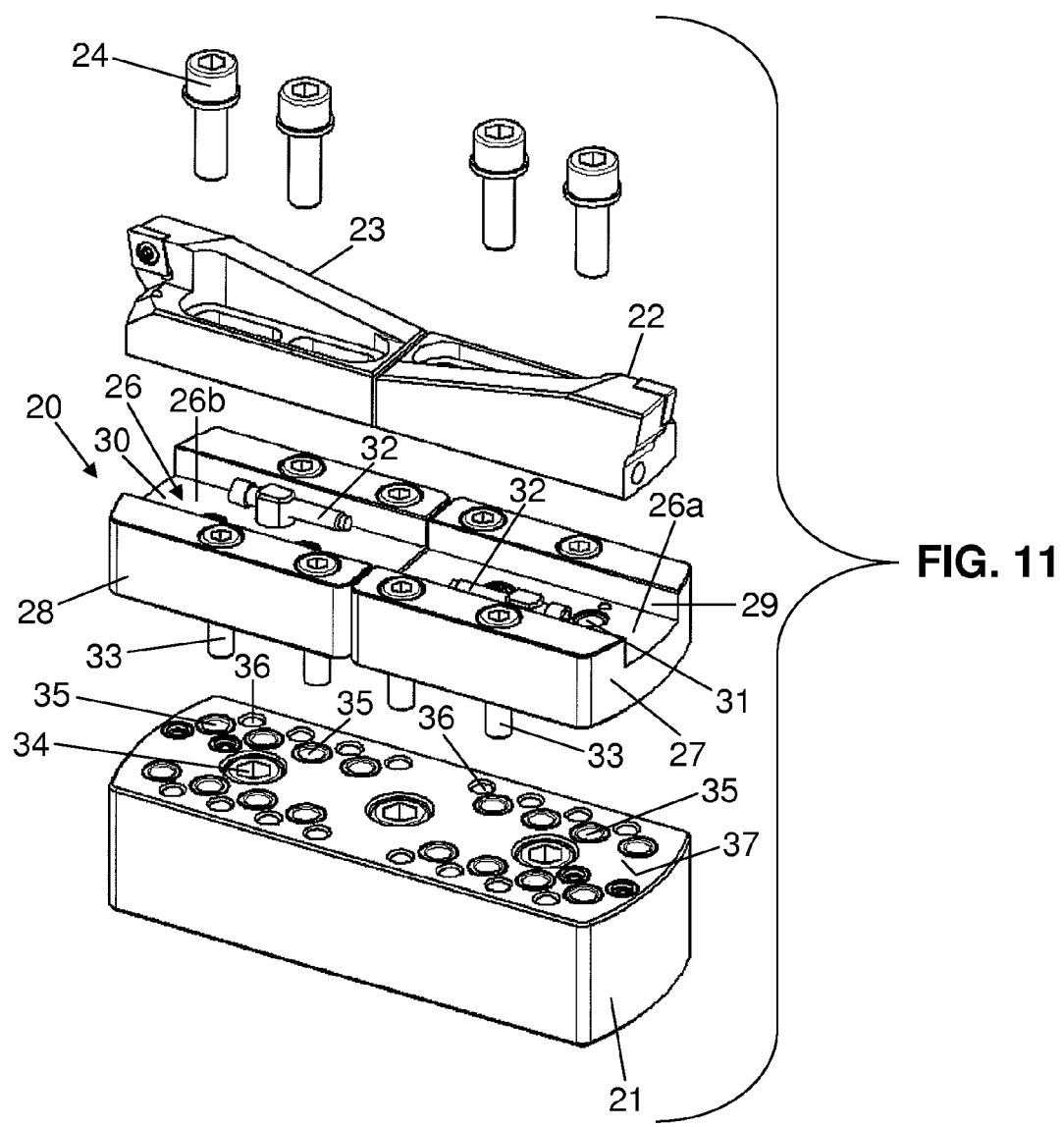
Figure 12:
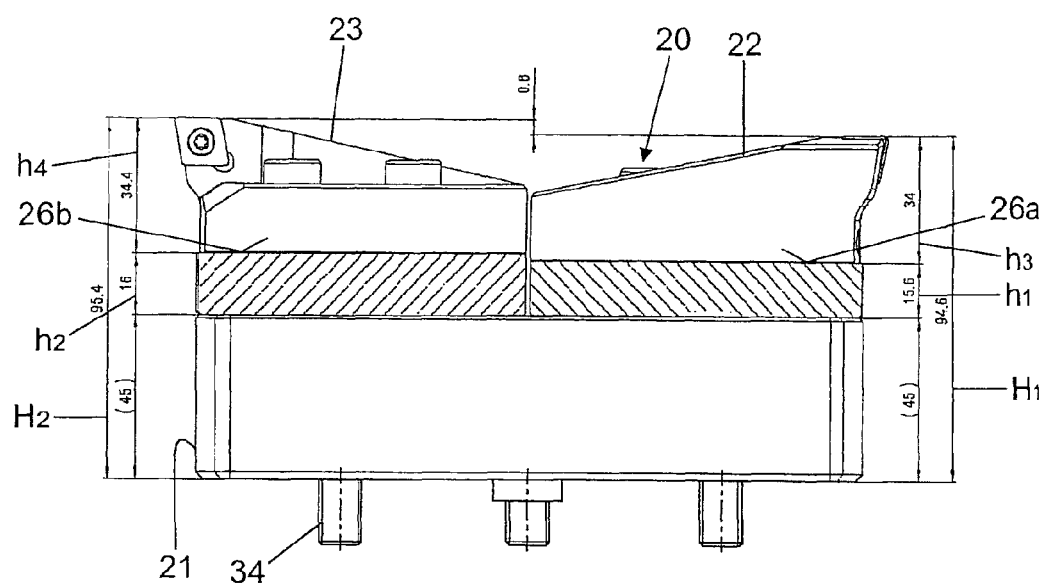

Exemplary embodiments of the invention are explained in more detail below with reference to the drawing, in which:

FIG. 1 shows a three-dimensional view of a boring head according to the invention, FIG. 2 shows a side view of the boring head according to FIG. 1, the two cutter holders being arranged for symmetrical roughing, FIG. 3 shows a view according to FIG. 2, although the two cutter holders are arranged for axially offset roughing, FIG. 4 shows a three-dimensional view of the boring head according to the invention, the individual parts being shown in an exploded arrangement for graphic reasons, FIGS. 5 and 6 show side views of the two cutter holders, the tooth system according to variants being different, FIGS. 7 and 8 show side views of the tool holder, the tooth system of the clamping surface being different, FIG. 9 shows a three-dimensional view of a variant of a boring head according to the invention, FIG. 10 shows a side view of the boring head according to FIG. 9, FIG. 11 shows a three-dimensional view of the boring head according to FIG. 9, individual parts being shown in an exploded arrangement for graphic reasons, and FIG. 12 shows a view according to FIG. 10, although intermediate parts are depicted in section.

The boring head shown in FIG. 1 has a tool body 2, on the underside of which there is a fastening peg 8 with which the boring head 1 can be fastened to a drive in a manner known per se. A bolt 9 running transversely through the fastening peg 8 serves for the anti-rotation locking. Two cutter holders 3 and 4 are mounted on the tool body 2 in a radially displaceable manner. Fastened to the two cutter holders 3 and 4, in each case by a fastening screw 6, is a cutting insert 5, which in each case projects axially beyond an end face 17. The cutting inserts 5 can be designed as indexable inserts.

The two cutter holders 3 and 4 are each fastened to the tool body 2 by a clamping screw 7. The clamping screws 7 each pass through an elongated hole 18 and are each inserted into a tapped hole (not shown here) in the tool body 2. If the clamping screws 7 are released, the two cutter holders 3 and 4 can be radially displaced in each case independently of one another to the extent that the elongated holes 18 allow this. The intended positions are each defined by a stop, which according to FIG. 4 is in each case formed by a setting screw 15. These setting screws 15 are mounted in a respective holder 16 in positions rotated through 180°. Corresponding recesses (not shown here) are provided on the undersides of the cutter holders 3 and 4 for these setting screws 15 and holders 16. The two cutter holders 3 and 4 are connected to the tool body 2 via toothing 10. This toothing comprises a tooth system 12 of a clamping surface 11 of the tool body 2 and tooth systems 13 of the two cutter holders 3 and 4. The tooth systems 12 and 13 are designed to correspond to one another, such that they correspondingly interlock.

The tooth system 12 of the clamping surface 11 has two partial clamping surfaces 11a and 11b which are of semicircular design and are offset from one another in the axial direction. In FIGS. 5 to 8, this axial offset is shown exaggerated for graphic reasons. In reality, the degree of this offset is substantially smaller, for example 0.2 mm. According to FIG. 8, two heights $h_1$ and $h_2$ are therefore provided, which in each case signify the distance of the partial clamping surfaces 11a and 11b from a clamping surface 19 of the tool body. The height $h_1$ is, for example, 28.1 mm and the height $h_2$ is 28.3 mm. According to FIG. 6, the two cutter holders 3 and 4 have different heights in the axial direction. These heights are designated by $h_3$ and $h_4$. Here, too, the difference between the heights $h_3$ and $h_4$ is shown exaggerated and is, for example, 0.2 mm. Here, the height $h_3$ is 20.4 mm and the height $h_4$ is 20.2 mm. The difference between $h_1$ and $h_2$ is therefore identical to the difference between $h_3$ and $h_4$. The heights $h_3$ and h4 in each case relate to the distance between the tooth system 13 and the cutting edge of the cutting insert 5.

The boring head 1' shown in FIGS. 5 and 7 differs from the boring head 1 merely in respect of the configuration of the clamping surface 11 or of the two partial clamping surfaces 11a' and 11b' and of the tooth systems 13' of the two cutter holders 3' and 4'. As can be seen, the tooth system 12' provided on the tool holder 2' is rectangular in cross section and designed to correspond to the tooth system 13'. Said axial differences in height are also provided in this boring head 1'. The tooth systems can therefore be designed differently.

With the exception of said differences in height, the cutter holders 3 and 4 or 3' and 4' are of identical design. They can therefore be interchanged. On account of said differences in height, the cutting inserts 5 are arranged in a rotationally symmetrical manner according to FIG. 2 or at least in an axially offset manner according to FIG. 3. In the arrangement according to FIG. 3, the cutter 5 of the cutter holder 3 is arranged at a height H1 and the cutting insert 5 of the cutter holder 4 is arranged at a height H2. Here, the difference in height is the sum of the difference in height between the partial clamping surfaces 11a and 11b and the difference in height between the two cutter holders 3 and 4. In the example shown, this difference is therefore 0.4 mm. The same correspondingly applies to the boring head according to FIGS. 5 and 7. The cutting edges of the two cutting inserts 5 are also relevant here.

Rotationally symmetrical roughing is possible with the boring head 1 according to FIG. 2. This rotationally symmetrical roughing is especially suitable for machining relatively small to average material allowances, for example 10% of the final diameter. At high cutting speeds, large feed rates are possible here. With the cutter arrangement, which is offset radially to a comparatively high degree, "full profile roughing" is also possible here.

In the cutter arrangement according to FIG. 3, offset and in particular double-offset roughing is possible. As a rule, the cutting inserts 5 here are offset both in diameter and in height or axially. This permits in particular the machining of twice the material allowance at half the feed rate values and excellent clamping control. Here, the material allowance is, for example, 20% of the final diameter. In order to change over the boring head 1 between the two settings shown in FIGS. 2 and 3, it is merely necessary to unscrew the clamping screws 7 from the tool holder 2, exchange the two cutter holders 3 and 4 and re-insert and tighten the two clamping screws 7. The toothing 10 is advantageous with regard to the stability, but is not imperative. The toothing 10 can therefore also be replaced by plane surfaces.

The boring head 20 shown in FIG. 9 is suitable for larger diameters of, for example, 200 to 600 mm. It is likewise suitable for the above-mentioned types of roughing. The boring head 20 has an elongated bridge base 21, on which two intermediate parts 27 and 28 are fastened. The two intermediate parts 27 and 28 are clamped against a top side 37 of the base 21 by fastening screws 33. Fastening screws 33 and tapped holes 36 in the base 21 are provided for this purpose. In addition, pins (not shown here) which engage in holes 35 in the base 21 are provided on the undersides of the intermediate parts 27 and 28. The tapped holes 36 and the holes 35 are arranged in such a way that they form a grid for different diameter positions. According to FIG. 9, the two intermediate parts 27 and 28 can be arranged essentially without a space in between or also at a distance from one another, such that a larger diameter can be machined. Said pins also permit sufficient stability at the large diameter. The base 21 and the two intermediate parts 27 and 28 form a tool body.

The two intermediate parts 27 and 28 each have a groove 29 and 30, respectively, at the top, which are in alignment with one another and which are provided for mounting a cutter holder 22 and 23, respectively. Setting screws 32 are arranged in each case inside the grooves 29 and 30 as radial stops for cutter holders 22 and 23. These cutter holders 22 and 23 each have two elongated holes 25, into which clamping screws 24 can be inserted, and said clamping screws 24 can be screwed into tapped holes 31 in order to secure the cutter holders 22 and 23 in the intermediate parts 27 and 28, respectively. If the clamping screws 24 are released, the two cutter holders 22 and 23 can each be adjusted radially independently of one another in accordance with the elongated holes 25. The intended positions are defined by the setting screws 32.

As shown in particular by FIG. 12, the intermediate parts 27 and 28 have a partial clamping surface 26a and 26b, respectively, against which the cutter holder 22 or 23, respectively, can be clamped. According to FIG. 12, these partial clamping surfaces 26a and 26b have different heights with respect to the top side 37 of the base 21. Thus the partial clamping surface 26a has the height h1 and the partial clamping surface 26b has the height h2. In this case, too, the difference in height is 0.2 mm. In FIG. 12, this difference in height is exaggerated for graphic reasons. In the exemplary embodiment shown, the height h1 is 15.6 mm and the height h2 is 16 mm.

The two cutter holders 22 and 23 likewise have different heights. Thus, the height h3 shown in FIG. 12 is 34 mm and the height h4 is 34.4 mm. In the arrangement shown in FIG. 12, which corresponds to that according to FIG. 10, the cutter of the cutter holder 23 is therefore offset from the cutter 5 of the cutter holder 22 by 0.8 mm. If the two cutter holders 22 and 23 are interchanged, said axial offset is 0. In this cutter arrangement, rotationally symmetrical roughing or full profile roughing is therefore possible. On the other hand, in the cutter arrangement according to FIGS. 10 and 12, the offset roughing is possible. In this case, the cutters can also be radially offset. The boring head 20 therefore likewise permits the above-mentioned types of roughing. Here, the cutter arrangement can likewise be changed over in a very simple manner. Even at comparatively large diameters, high stability is ensured. The boring head 20 can be fastened to a drive in a manner known per se. For this purpose, three fastening screws 34 which pass through the base 21 are provided.

LIST OF DESIGNATIONS

1 Boring head
2 Tool body
3 Cutter holder
4 Cutter holder
5 Cutting insert
6 Fastening screw
7 Clamping screw
8 Fastening peg
9 Bolt
10 Toothing
11 Clamping surface
11a Partial clamping surface
11b Partial clamping surface
12 Tooth system
13 Tooth system
14 Hole
15 Setting screw
16 Holder
17 End face
18 Elongated hole 19 Clamping surface
20 Boring head
21 Bridge
22 Cutter holder
23 Cutter holder
24 Clamping screw
25 Elongated hole
26 Clamping surface
26a Partial clamping surface
26b Partial clamping surface
27 Intermediate part
28 Intermediate part
29 Groove
30 Groove
31 Hole
32 Setting screw
33 Fastening screw
34 Fastening screw
35 Hole
36 Tapped hole
37 Top side
38 Tool body

The invention claimed is:

1. Boring head comprising:
a tool body,
first and second cutter holders,
two clamping screws detachably fastening the first and second cutter holders respectively, against clamping surfaces of said tool body, said first and second cutter holders being arranged offset from one another by 180° and being mounted on the clamping surface in a slidable manner for radially adjusting a position of the first and second cutters, and
adjusting means for adjusting a radial position of the first and second cutter holders with respect to the tool body independently of one another,
wherein the clamping surface has a first partial clamping surface for the first cutter holder and a second partial clamping surface for the second cutter holder, respectively, the two partial clamping surfaces being offset in an axial direction by a certain extent, the first and second cutter holders having different heights with respect to each other in accordance with the certain extent, and the first and second cutter holders can be optionally fastened to and radially adjusted on the first partial clamping surface or the second partial clamping surface.

2. Boring head according to claim 1, wherein the tool body has an essentially rotational form and the two partial clamping surfaces have an essentially semicircular shape.

3. Boring head according to claim 1, wherein the first and second cutter holders are each guided in a radially displaceable manner with toothing on the tool body.

4. Boring head according to claim 3, wherein the toothing has grooves and ribs running parallel to one another.

5. Boring head according to claim 1, wherein the tool body has an elongated shape.

6. Boring head according to claim 5, wherein the first and second cutter holders each have an elongated shape and are radially displaceably guided in a groove.

7. Boring head according to claim 5, wherein the tool body has two intermediate parts, on which one each of the first and second cutter holders is guided in a radially displaceable manner.

8. Boring head according to claim 6, wherein the two intermediate parts are fastened in different radial positions on the tool body according to a predetermined grid.

9. Boring head according to claim 8, wherein the tool body has a plurality of holes according to the predetermined grid.

10. Boring head according to claim 7, wherein the intermediate parts each have one of the two partial clamping surfaces and the two partial clamping surfaces have different heights with respect to a surface of a part of the tool body.

* * * * *